US011803940B2

(12) United States Patent
Mulchandani et al.

(10) Patent No.: US 11,803,940 B2
(45) Date of Patent: Oct. 31, 2023

(54) ARTIFICIAL INTELLIGENCE TECHNIQUE TO FILL MISSING WELL DATA

(71) Applicant: Schlumberger Technology Corporation, Sugar Land, TX (US)

(72) Inventors: Kishore Mulchandani, Henderson, NV (US); Abhishek Gupta, San Jose, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 177 days.

(21) Appl. No.: 16/949,269

(22) Filed: Oct. 22, 2020

(65) Prior Publication Data
US 2021/0125312 A1    Apr. 29, 2021

Related U.S. Application Data

(60) Provisional application No. 62/925,187, filed on Oct. 23, 2019.

(51) Int. Cl.
*G06T 5/00* (2006.01)
*G06N 3/084* (2023.01)

(52) U.S. Cl.
CPC ............. *G06T 5/002* (2013.01); *G06N 3/084* (2013.01); *G06T 2207/20081* (2013.01); *G06T 2207/20084* (2013.01); *G06T 2207/20221* (2013.01)

(58) Field of Classification Search
CPC ........... G06T 5/002; G06T 2207/20081; G06T 2207/20084; G06T 2207/20221; G06N 3/084; G06N 3/045; G06N 3/047
See application file for complete search history.

(56) References Cited

U.S. PATENT DOCUMENTS

| 10,452,441 | B1  | 10/2019 | Subramanian et al. |
| 10,634,807 | B2* | 4/2020  | Tang ..................... E21B 47/085 |
| 10,755,483 | B1  | 8/2020  | Cote et al. |
| 11,105,942 | B2* | 8/2021  | Alwon .................. G01V 1/282 |
| 11,520,077 | B2* | 12/2022 | Denli ...................... G01V 1/28 |
| 2013/0093776 | A1 | 4/2013 | Chakraborty et al. |
| 2017/0006135 | A1 | 1/2017 | Siebel et al. |
| 2017/0168729 | A1 | 6/2017 | Faulkner et al. |
| 2019/0294473 | A1 | 9/2019 | Martin et al. |
| 2020/0183032 | A1* | 6/2020 | Liu ......................... G01V 1/282 |
| 2020/0208510 | A1* | 7/2020 | Guijt ........................ E21B 47/26 |
| 2020/0292723 | A1* | 9/2020 | Zhang ................... G06N 20/20 |
| 2020/0342068 | A1 | 10/2020 | Cai et al. |
| 2021/0124614 | A1 | 4/2021 | Gupta et al. |

(Continued)

OTHER PUBLICATIONS

Goodfellow et al. "Conditional generative adversarial nets." arXiv preprint arXiv:1411.1784 (2014). (Year: 2014).*

(Continued)

*Primary Examiner* — Andrae S Allison
(74) *Attorney, Agent, or Firm* — Michael Guthrie

(57) ABSTRACT

A discriminator of a training model is trained to discriminate between original training images without artificial subsurface data and modified training images with artificial subsurface data. A generator of the training model is trained to: replace portions of original training images with the artificial subsurface data to form the modified training images, and prevent the discriminator from discriminating between the original training images and the modified training images.

8 Claims, 6 Drawing Sheets

(56) References Cited

U.S. PATENT DOCUMENTS

2021/0150807 A1* 5/2021 Zhou .................. G06V 20/10
2021/0311221 A1* 10/2021 Roy .................... G01V 1/48
2022/0335317 A1  10/2022 Segner et al.
2022/0351403 A1* 11/2022 Jiang .................. G06N 3/047

OTHER PUBLICATIONS

Oliveira et al., Interpolating Seismic Data With Conditional Generative Adversarial Networks, IEEE Geoscience and Remote Sensing Letters, vol. 15, No. 12, Dec. 2018 (Year: 2018).*

Yeh et al., "Semantic Image Inpainting with Deep Generative Models," posted on arXiv on Jul. 26, 2016, accessed on Oct. 22, 2020 https://arxiv.org/abs/1607.07539, 19 pages.

Brandon Amos, "Image Completion with Deep Learning in TensorFlow," http://bamos.github.io/2016/08/09/deep-completion/ accessed on Oct. 22, 2020, 32 pages.

Office Action issued in U.S. Appl. No. 16/949,271 dated Jan. 31, 2023, 15 pages.

Notice of Allowance issued in U.S. Appl. No. 16/949,271 dated May 26, 2023, 9 pages.

* cited by examiner

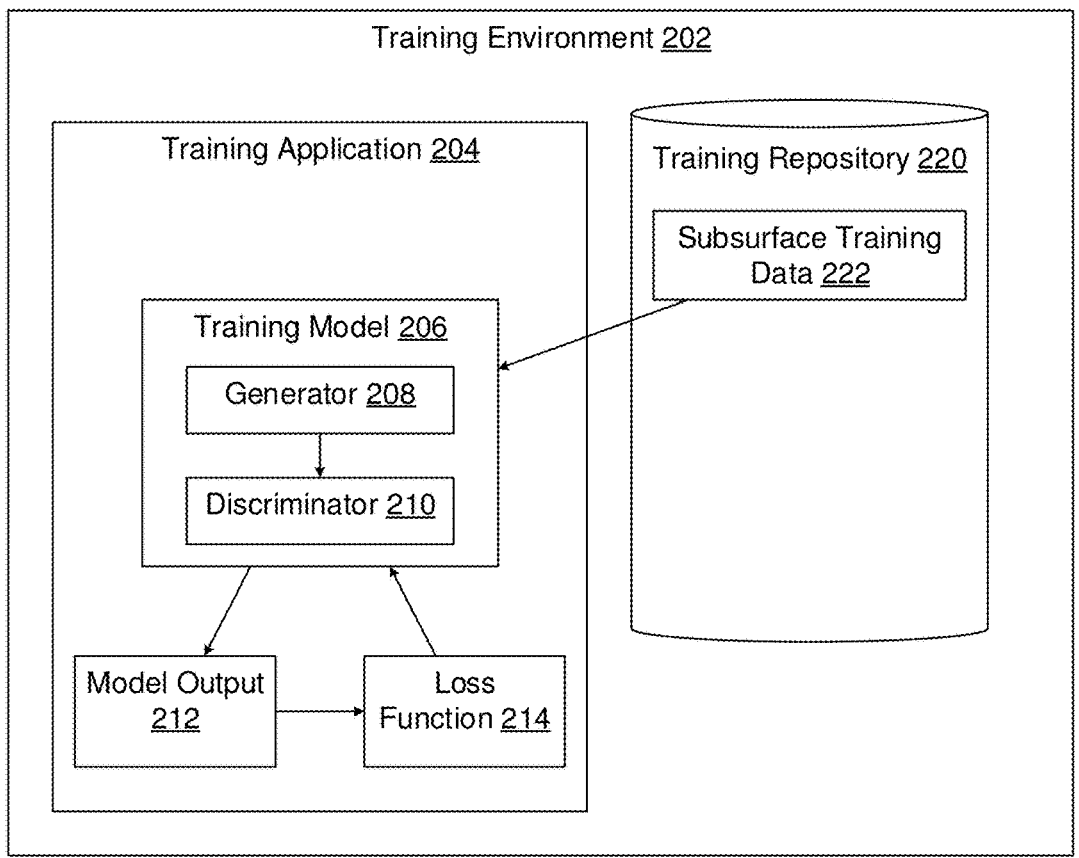
FIG. 2.1
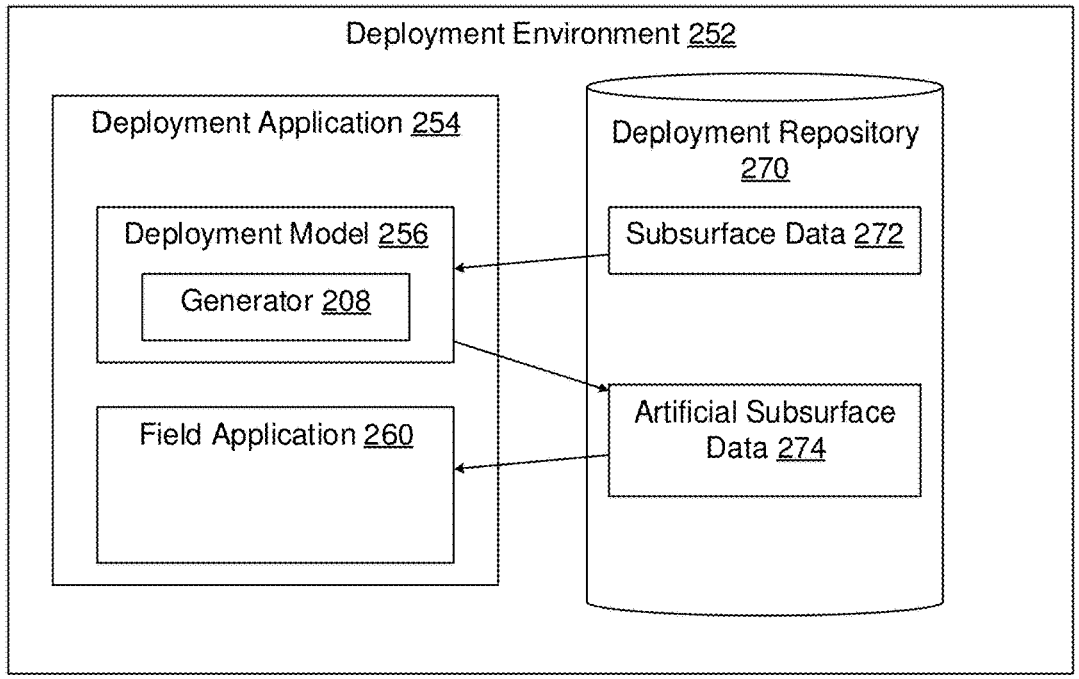
FIG. 2.2

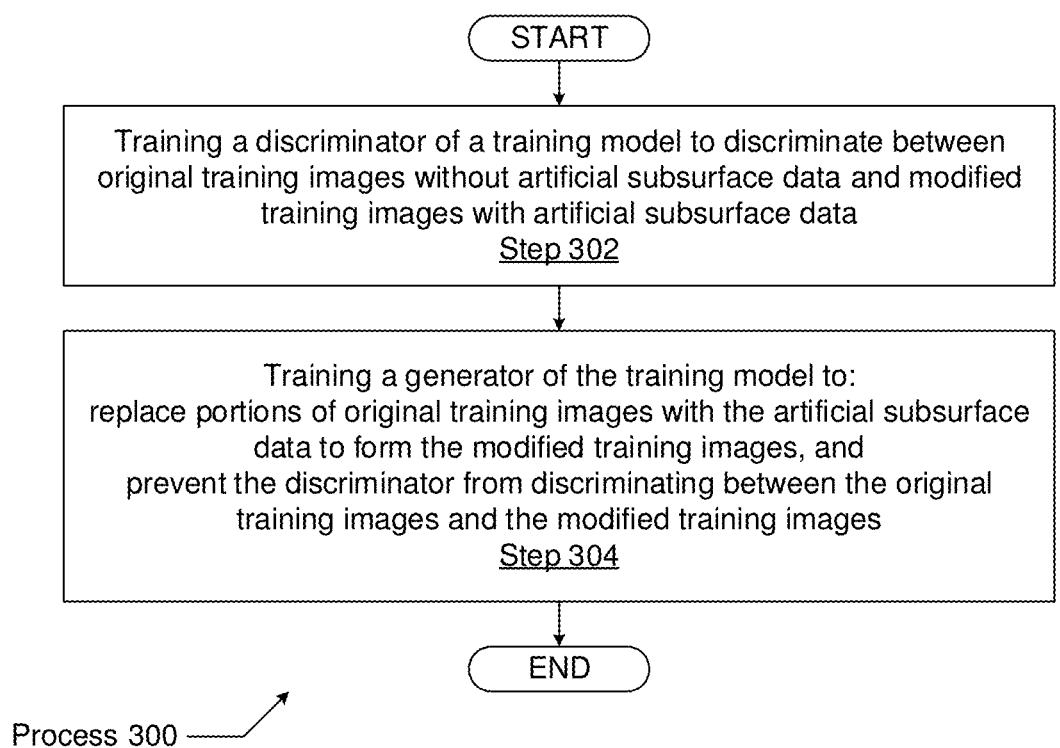
FIG. 3.1

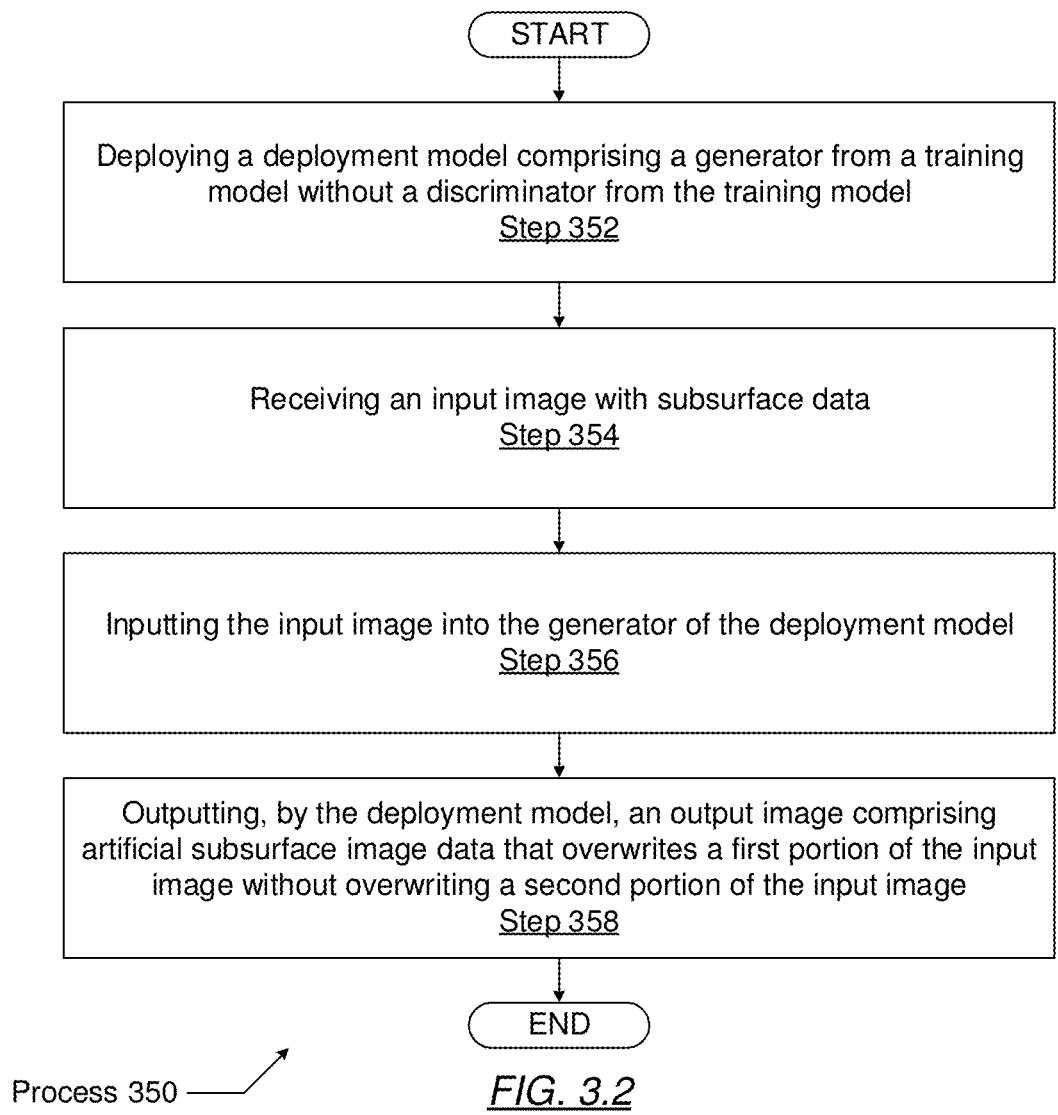
FIG. 3.2

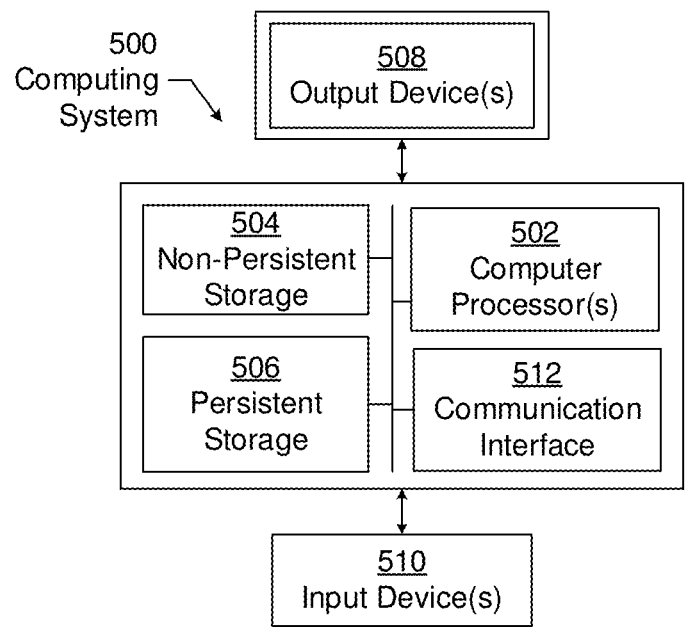
FIG. 5.1
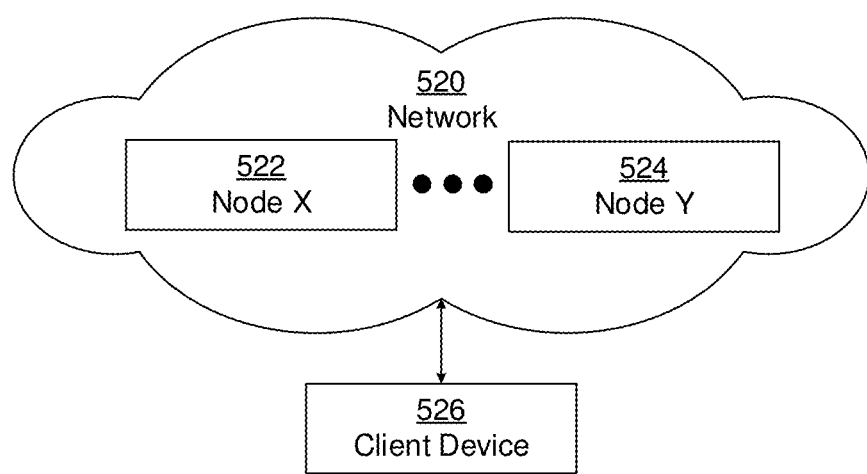
FIG. 5.2

ARTIFICIAL INTELLIGENCE TECHNIQUE TO FILL MISSING WELL DATA

CROSS-REFERENCE TO RELATED APPLICATIONS

This patent claims priority from U.S. Provisional Patent Application No. 62/925,187 filed on Oct. 23, 2019. U.S. Provisional Patent Application No. 62/925,187 is hereby incorporated by reference.

BACKGROUND

When measuring or logging while drilling (MWD) or (LWD), some portions of the data might be missing due to several reasons. For example, the data may not have been captured, there may have been errors in transmission, or the design and orientation of the tool may have precluded capturing portions of data.

Several passes are often made along the well due to the nature of drilling and multiple readings are available. Multiple reading may be used to fill in missing portions of the data. However, situations occur where the data is missing, either permanently, or temporarily (before multiple passes provide the missing data). The missing data may create a lack of guidance that may negatively impact a drilling plan of a well.

SUMMARY

In general, in one or more aspects, the disclosure relates to a method that includes training a discriminator of a training model to discriminate between original training images without artificial subsurface data and modified training images with artificial subsurface data. A generator of the training model is trained to: replace portions of original training images with the artificial subsurface data to form the modified training images, and prevent the discriminator from discriminating between the original training images and the modified training images.

Other aspects of the disclosure will be apparent from the following description and the appended claims.

BRIEF DESCRIPTION OF DRAWINGS

FIG. 1, FIG. 2.1, and FIG. 2.2 show diagrams of systems in accordance with disclosed embodiments.

FIG. 3.1 and FIG. 3.2 show flowcharts in accordance with disclosed embodiments.

FIG. 5.1 and FIG. 5.2 show computing systems in accordance with disclosed embodiments.

DETAILED DESCRIPTION

Figure 1:
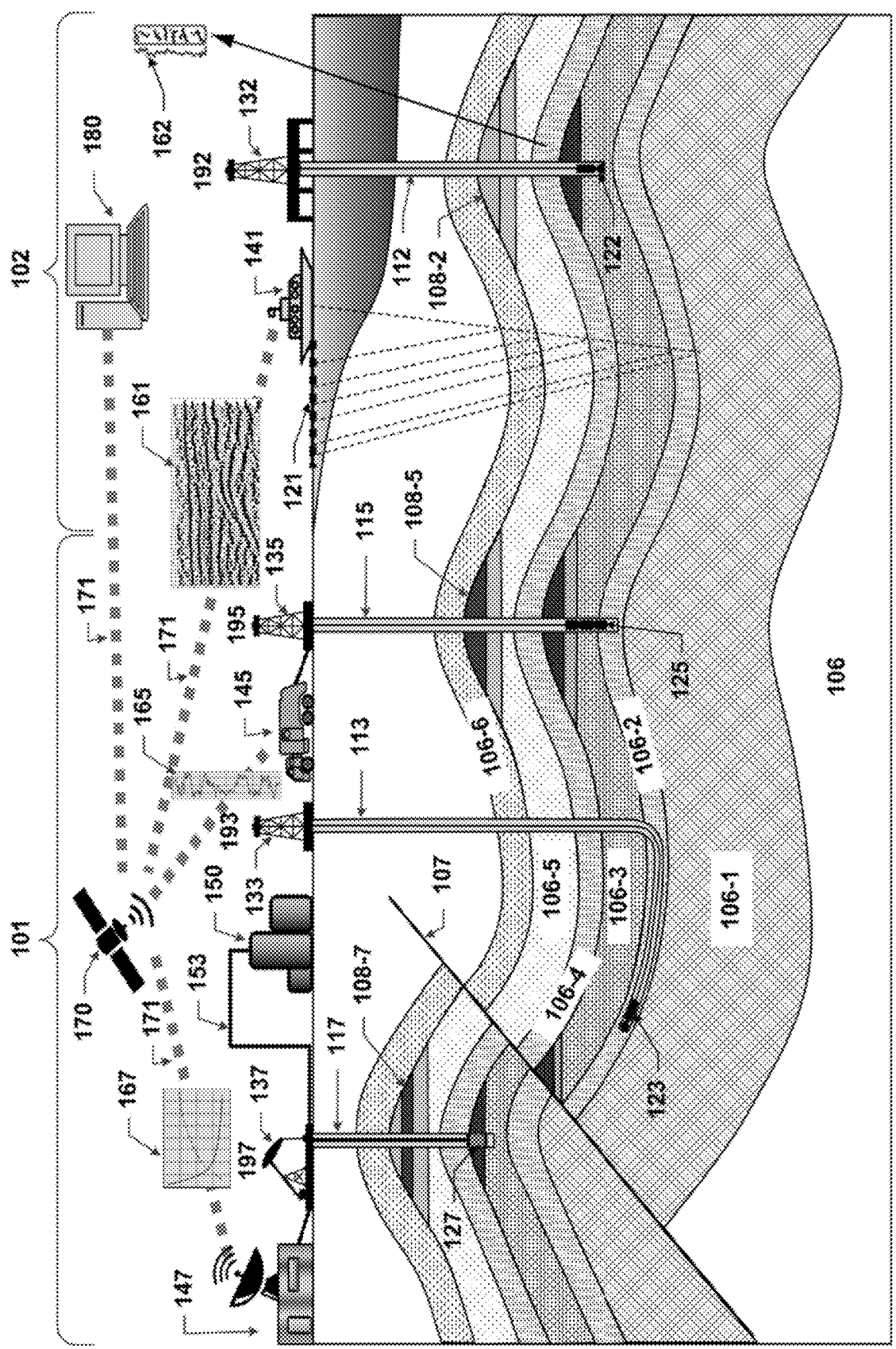

Specific embodiments will now be described in detail with reference to the accompanying figures. Like elements in the various figures are denoted by like reference numerals for consistency.

In the following detailed description of embodiments of the technology, numerous specific details are set forth in order to provide a more thorough understanding. However, it will be apparent to one of ordinary skill in the art that various embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The systems and methods according to the disclosure may use a generative adversarial network (GAN) to fill in missing data portions and may also improve the data by adding artificial subsurface data. Filling in missing data may provide guidance that may positively impact a drilling plan for a well. Additionally, data may have been generated with measurement tools with low resolution. Namely, different classes of measurement tools have different resolutions of data being measured. The low resolution data may be filled in with artificial subsurface data using the systems and methods according to the disclosure.

The neural networks used by the system are trained based on the data from well logs, especially from the same region, where geological similarities may exist for the data that is to be supplemented with artificial subsurface data.

The aperture for training may be varied based on the type of geological features. Further, multiple properties may be combined in logical and mathematical ways to produce alternate images for training. One or more embodiments may use types of images that are provided as input to a discriminator network of the generative adversarial network (GAN). The types of image may include, for example, raw images of varying aperture based on feature, and combined images based on certain formulae created to highlight correlations among different properties.

If various readings at a single measured depth are recorded as a row of data, with each column representing a particular orientation (azimuth), then aperture would be a certain depth segment. For example, a ten feet aperture would include 10 rows of data if each depth sample was one foot apart. The number of rows in a given aperture may be a variable number depending on the regularity of depth samples. If the samples were taken at irregular intervals, there may be a variable number of rows. Rather than train the neural network to images of different heights, additional rows with data interpolated from the original rows of measured data may be added to remove the depth irregularities. After removing the depth irregularities, the machine learning model may be trained with uniform image heights and aperture depths.

Generative adversarial networks (GANs) according to one or more embodiments may learn to imitate any distribution of data. Deep convolutional generative adversarial networks (DCGANs) of embodiments disclosed herein may be modified to be specific to data related to the extraction of hydrocarbons, such as wellbore surface images. The deep convolutional generative adversarial networks are neural networks that may include a neural network referred to as a discriminator network and a neural network referred to as a generator network. The discriminator network classifies an input image and the generator network modifies an image. The discriminator network may be used to classify whether an image includes geological features. The generator network may be used to fill in missing data of an image with artificial subsurface data. The neural networks disclosed may include multiple layers, arrangements, and architectures of neural networks, including convolutional layers and fully connected layers. The image may include subsurface data from well logs.

In general, a machine learning model (e.g., a generative adversarial network (GAN)) is trained to fill in subsurface data in images of subsurface data with artificial subsurface data. The machine learning model may include a discriminator trained to classify subsurface images. The machine learning model may include a generator that may be trained in combination with the discriminator to generate artificial subsurface data that is missing from the subsurface images. For example, the original subsurface image may have been generated with a tool that malfunctioned during operation leading to a loss of data or missing data. The lost or missing data may be filled in with the generator and then further analyzed to control drilling operations.

"Image" in the context of LWD is a data structure that includes property measurements made with various sensors in a borehole. In one embodiment, the data structure may be two dimensional (2D) array, whereby each row may correspond to a new depth value and each column may correspond to a particular direction around the hole. Depending on the tools used, approximately 180 measurements may exist around the circumference. An example of an image is the training image (402) shown in FIG. 4.

Turning to the figures, FIG. 1 depicts a schematic view, partially in cross section, of an onshore field (101) and an offshore field (102) in which one or more embodiments may be implemented. The embodiments of FIG. 1 may include the features and embodiments described in the other figures of the application. One or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an E&P computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). The rock formations may include at least one seal rock, for example, the shale layer (106-6), which may act as a top seal. The rock formations may include at least one source rock, for example, the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

Data acquisition tools (121), (123), (125), and (127), may be positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit, e.g., the seismic acquisition vessel (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). A wellsite system may be connected to a production equipment. For example, the well system (197) is connected to the surface storage tank (150) through the fluids transport pipeline (153).

The surface units (141), (145), and (147), may be operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. The surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

The surface units (141), (145), and (147) may be communicatively coupled to the E&P computer system (180) via the communication links (171). The communication between the surface units and the E&P computer system (180) may be managed through a communication relay (170). For example, a satellite, tower antenna or any other type of communication relay may be used to gather data from multiple surface units and transfer the data to a remote E&P computer system (180) for further analysis. Generally, the E&P computer system (180) is configured to analyze, model, control, optimize, or perform management tasks of the aforementioned field operations based on the data provided from the surface unit. The E&P computer system (180) may be provided with functionality for manipulating and analyzing the data, such as analyzing seismic data to determine locations of hydrocarbons in the geologic sedimentary basin (106) or performing simulation, planning, and optimization of E&P operations of the wellsite system. The results generated by the E&P computer system (180) may be displayed for user to view the results in a two-dimensional (2D) display, three-dimensional (3D) display, or other suitable displays. Although the surface units are shown as separate from the E&P computer system (180) in FIG. 1, in other examples, the surface unit and the E&P computer system (180) may also be combined. The E&P computer system (180) and/or surface unit may correspond to a computing system, such as the computing system shown in FIGS. 5A and 5B and described below.

FIG. 2.1 and FIG. 2.2 show diagrams of embodiments that are in accordance with the disclosure. FIG. 2.1 shows the training system (200) that trains machine learning models for generating subsurface data. FIG. 2.2 shows the system (250) that deploys machine learning models for generating subsurface data. The embodiments of FIG. 2.1 and FIG. 2.2 may be combined and may include or be included within the features and embodiments described in the other figures of the application. The features and elements of FIG. 2.1 and FIG. 2.2 are, individually and as a combination, improvements to the technology of machine learning. The various elements, systems, and components shown in FIG. 2.1 and FIG. 2.2 may be omitted, repeated, combined, and/or altered as shown from FIG. 2.1 and FIG. 2.2. Accordingly, the scope of the present disclosure should not be considered limited to the specific arrangements shown in FIG. 2.1 and FIG. 2.2.

Turning to FIG. 2.1, the training system (200) includes the training environment (202). The training environment (202) includes the hardware and software components to train the generator (208) to generate subsurface data. The training environment (202) may include multiple computing systems in accordance with those described in FIGS. 5.1 and 5.2 and, for example, may include smartphones, desktop computers, server computers, etc. The training environment (202) may include a cloud computing environment with multiple servers that host the training application (204) and the training repository (220). The cloud computing environment may be operated by a cloud services provider that provides hosting, virtualization, and data storage services as well as other cloud services. The training environment (202) may be a single computing that trains the training model (206) or may include multiple computing systems that train the training model (206).

The training application (204) is a set of programs stored in the memory and executing on at least one processor of the training environment (202). The training application (204) loads the training model (206), loads the subsurface training data (222), and trains the training model (206) with the subsurface training data (222). In one embodiment, the training application (204) uses backpropagation to iteratively update the training model (206). For example, the training application (204) may apply the loss function (214) to the model output (212) to generate weight updates for the weights of the training model (206) and then apply the weight updates to the training model (206). The training application (204) may train the discriminator (210) with or without training the generator (208). When the generator (208) is trained with the discriminator (210), updates for the generator (208) and the discriminator (210) are calculated based off of the output from the discriminator (210) and propagated to both the discriminator (210) and generator (208).

The training application (204) may slice the subsurface training data (222) into images having a resolution that matches the resolution used by the training model (206). For example, the subsurface training data (222) may use cylindrical coordinates with rows corresponding to the depth in the borehole and columns corresponding to the azimuth at that depth for a particular value. There may be thousands to millions of rows of data for the length and tens to hundreds to thousands of columns of data for azimuth. The training application (204) may slice the subsurface training data (222) into rectangular images of a particular resolution (e.g., 1024 rows by 256 columns).

The training model (206) is a machine learning model that includes the generator (208) and the discriminator (210). The training model (206) receives the subsurface training data (222) and generates the model output (212). The training model (206) receives weight updates from the loss function (214). In one embodiment, the training model (206) is a neural network model that is a generative adversarial network (GAN). The training model (206) includes the generator (208) and the discriminator (210).

The generator (208) is a part of the training model (206). The generator (208) receives an input image (which may be an original training image that has missing data) of subsurface data and generates an output image (also referred to as a modified training image) that includes artificial subsurface data. The artificial subsurface data is created by the generator (208) and may replace missing data from the subsurface data of the input image. In one embodiment, the generator (208) is a neural network. In one embodiment, generator (208) may include multiple convolutional neural network layers and multiple fully connected layers. During training, the generator (208) learns to generate artificial subsurface data that is difficult to distinguish from actual subsurface data.

The discriminator (210) is another part of the training model (206). The discriminator (210) may be trained independently from the generator (208). In one embodiment, the discriminator (210) is a classifier that identifies if an input image includes artificially generated data. The discriminator (210) may receive input images that are directly from the subsurface training data (222) (also referred to as original training images) and may receive images that are output from the generator (208) (modified training images). During training, the discriminator (210) learns to distinguish between images with real subsurface data and images with artificial subsurface data. As the generator (208) iteratively improves at generating artificial subsurface data, the discriminator (210) iteratively improves at discriminating between images with real subsurface data and images with artificial subsurface data. The original training images that do not include artificial subsurface data and are used to train the discriminator (210) may be free from degradations, i.e., may not have missing data, resolution issues, noise issues, etc.

The model output (212) is the output from the training model (206). The model output (212) may be a single floating-point value (from the discriminator (210)) with a range from 0 to 1 with zero indicating at the image input to discriminator (210) includes artificial data and 1 indicating that the image input to discriminator (210) does not include artificial data.

The loss function (214) is a function that generates updates for the training model (206) from the model output (212). In one embodiment, the loss function (214) compares the model output (212) to a label. The label identifies whether the input to the discriminator (210) is real data from the subsurface training data (222) or was generated by the generator (208).

The training repository (220) is a computing system in the training environment (202) that may include multiple computing devices in accordance with the computing system (500) and the nodes (522 and 524) described below in FIGS. 5.1 and 5.2. The training repository (220) may be hosted by a cloud services provider. The cloud services provider may provide hosting, virtualization, and data storage services as well as other cloud services that are used to operate and control the data, programs, and applications that store and retrieve data from the training repository (220). The data in the training repository (220) includes the subsurface training data (222).

The subsurface training data (222) is data that is used to train the training model (206). The subsurface training data (222) may include several recordings of subsurface data from multiple wells.

Turning to FIG. 2.2, the system (250) includes the deployment environment (252). The deployment environment (252) may be the same as, different from, or overlap with the training environment (202) described in reference to FIG. 2.1. The deployment environment (252) includes the hardware and software components to use the generator (208) to generate the artificial subsurface data (274) used by the field application (260). The deployment environment (252) may include multiple computing systems in accordance with those described in FIGS. 5.1 and 5.2 and, for example, may include smartphones, desktop computers, server computers, etc. The deployment environment (252) may include a cloud computing environment with multiple servers that host the deployment application (254) and form the deployment repository (270). The cloud computing environment may be operated by a cloud services provider that provides hosting, virtualization, and data storage services as well as other cloud services. The deployment environment (252) may be a single computing system that deploys the deployment model (256) or may include multiple computing systems that deploy the deployment model (256).

The deployment application (254) is a set of programs stored in the memory and executing on at least one processor of the deployment environment (252). The deployment application (254) loads the deployment model (256), loads the subsurface data (272), and generates the artificial subsurface data (274) with the deployment model (256). The deployment application (254) may load the artificial subsurface data (274) into the field application (260). The deployment application (254) may resize, shape, format, slice, etc. the subsurface data (272) to fit the input properties of the generator (208). The deployment application (254) may resize, shape, format, slice, etc. the output images from the generator of the deployment model (256) to form the artificial subsurface data (274).

The deployment model (256) is a machine learning model that includes the generator (208), which was trained by the training model (206) (shown in FIG. 2.1). The deployment model (256) receives the subsurface data (272) and generates the artificial subsurface data (274).

The generator (208) is a part of the deployment model (256). The generator (208) receives an input image from the subsurface data (272) and generates an output image that includes artificial subsurface data and is stored in the artificial subsurface data (274) in the deployment repository (270). The artificial subsurface data is created by the generator (208) and may replace missing data from the subsurface data (272) of the input image.

The deployment repository (270) is a computing system in the deployment environment (252) that may include multiple computing devices in accordance with the computing system (500) and the nodes (522 and 524) described below in FIGS. 5.1 and 5.2. The deployment repository (270) may be hosted by a cloud services provider. The cloud services provider may provide hosting, virtualization, and data storage services as well as other cloud services that are used to operate and control the data, programs, and applications that store and retrieve data from the deployment repository (270). The data in the deployment repository (270) includes the subsurface data (272) and the artificial subsurface data (274).

The subsurface data (272) is data that measures the properties of subsurface features, well features, geological features, etc. The subsurface data (272) may include data sets with derivative properties of a wellsite that are determined from combinations of multiple wellsite properties and are generated offsite. In one embodiment, the subsurface data (272) is resistivity data and each pixel in an image corresponds to a depth and rotation angle of a borehole. Additional properties and metadata may be included with the subsurface data (272), including aperture size of the borehole, angle of inclination of the borehole, radioactivity, humidity, porosity, etc.

The artificial subsurface data (274) is created by the generator (208). The artificial subsurface data (274) may replace missing data from the subsurface data (272).

FIGS. 3.1 and 3.2 show a flowcharts in accordance with the disclosure. The process (300) of FIG. 3.1 trains a machine learning model to generate artificial subsurface data and differentiate between original and artificial subsurface data. The process (350) of FIG. 3.2 uses a machine learning model to generate artificial subsurface data. The embodiments of FIGS. 3.1 and 3.2 may be combined and may include or be included within the features and embodiments described in the other figures of the application. The features of FIGS. 3.1 and 3.2 are, individually and as an ordered combination, improvements to the technology of computing systems, machine learning systems, E&P computer systems, and wellsite systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 3.1, in Step 302, a discriminator of a training model is trained to discriminate between original training images without artificial subsurface data and modified training images with artificial subsurface data. The discriminator receives multiple input images that may or may not include artificial subsurface data. The discriminator outputs a value that identifies whether an input image includes artificial subsurface data. Output values are compared with labels (provided for each input image) that identify whether an input image includes artificial subsurface. The difference between a label and an output value for an input image is calculated with a loss function. The output from the loss function is backpropagated through the weights of the discriminator to increase the accuracy of the discriminator. The input images may include original training images that have not been modified and do not include any degradations (missing data, noise, artifacts, etc.) and may include modified training images that are generated by a generator include artificial subsurface data.

Additionally, besides supplying the input image to the discriminator, other attributes of the well may be of note and provided as an input to the discriminator. For example, the inclination angle and bit size (diameter) may also be supplied as inputs to the discriminator.

In one embodiment, training images may be obtained from sources of subsurface data by taking the raw subsurface data and selecting regions in the raw subsurface data that correspond to areas of interest. Areas of interest may include areas around dips, areas around fractures, areas around networks, areas that are drilling artifacts, areas with no drilling artifacts, areas with high contrast, areas with noise, etc. The "aperture" or "window" of the image may be selected based on the type of features. For example, dips may extend for a certain number of centimeters or meters for wells with lower deviation. After selecting the features, the images may be created and resized for the input size dimensions used by the training model.

In Step 304, a generator of the training model is trained to replace portions of original training images with the artificial subsurface data to form the modified training images and to prevent the discriminator from discriminating between the original training images and the modified training images. The generator receives training images with degradations. The degradations are portions of the images with areas having missing data, drilling artifacts, contrast issues (too low or too high), resolution issues (e.g., inconsistent resolution), noise, etc. The generator generates output images that replace the degradations with artificial subsurface data to remove the degradations. The generator receives backpropagation feedback from the discriminator to update the weights of the generator based on whether the discriminator was able to identify that the output from the generator included artificial subsurface data. As the generator is trained with more images, the generator may create artificial subsurface data that may not be detected by the discriminator.

In one embodiment, a mask may be applied to original training images that remove subsurface data from the input image resulting in masked images. The masked images are labeled as including artificial subsurface data and may then be used as inputs from training the generator and the discriminator.

In one embodiment, the generator is trained with the discriminator. For example, an input image is input to the generator and the output image from the generator is then input to the discriminator. The discriminator outputs a value that identifies whether the image from the generator includes artificial subsurface data. Since the input to the discriminator was generated by the generator, the output value from the discriminator should indicate that the input to the discriminator included artificial subsurface data. The output value from the discriminator is compared to a label generated for the input image with a loss function that outputs an error value. The error value is then back propagated through both the discriminator and the generator to improve the accuracy of both the generator and the discriminator.

In one embodiment, the generator includes a first convolutional neural network and the discriminator includes a second convolutional neural network. Each of the independent convolutional neural networks may have multiple layers and multiple filters for each layer. The discriminator may also include a fully connected neural network that generates the final output value of the discriminator from the output of the convolutional neural network of the discriminator. Additional types, layers, lost functions, etc., may be used for the neural networks of the generator and discriminator.

Turning to FIG. 3.2, in Step 352, a deployment model is deployed that includes a generator from a training model without a discriminator from the training model. After being trained with the discriminator in a training model, the generator may be separated from the discriminator and deployed without discriminator. Deployment of the deployment model may include loading the deployment model from persistent storage to a local memory or cache for use and access by a deployment application.

In Step 354, an input image with subsurface data is received. The input image may be received after being sliced from a set of subsurface data captured with data acquisition tools at a wellsite. The input image may include degradations.

In one embodiment, multiple geological properties may be combined to form the values in the input image. Correlation between two different properties may be relevant to processing subsurface data. The combination may be generated by selecting areas of two different measured properties with the same aperture (window of measured-depth values) and then performing a blend of the two properties. A blend may be executed with a mathematical functions, logical functions combinations thereof, etc. For example, a blend function of "Rs>60 Ohms and Caliper Radius<=4.25 inches" is a blend where resistivity is greater than 60 Ohms but the caliper radius is less that 4.25 inches.

Additionally, inclination and resistivity may be combined. Certain orientations of the borehole with respect to the surface may result in certain specific patterns. A blend function may use inclination of the well at a given measured depth.

Linear combinations may also be used. For example the linear function "P=(1−t)*Pa+t Pb" may be used where "P" is the combined property, "Pa" is the first selected property, "Pb" is the second selected property, and "t" is a weight that identifies the relative proportions of Pa and Pb to use to generate P. Higher orders of degree 2 and above may also be used.

The combination of multiple properties may be a "fusion" of different images (i.e., of different properties) at a "pixel" level. E.g., a resistivity image (R) and a gamma ray image (G), may be combined (R+G) in many different ways to form a fusion. One combination may be simply using R values and G values as separate channels in a single image. Additional types of combinations may change the values of R or G based on each other may be used, including linear combinations, exponential combinations, polynomial combinations, etc.

In Step 356, the input image is input into the generator of the deployment model. The input image into a resolution and type of data for which the generator was trained.

In Step 358, an output image is outputting by the deployment model. The output image includes artificial subsurface image data that overwrites a first portion of the input image without overwriting a second portion of the input image. For example, the first portion may be a set of contiguous rows of the input image that has missing data. The generator may overwrite the rows of missing data with artificial subsurface data. The second portion of the image may be the contiguous rows that do not have the same data, which the generator does not overwrite.

In one embodiment, the first portion of the input image is masked from the second portion of the input image using a smart pattern generator. The smart pattern generator may create a mask image that is combined with the input image to form a combined image that is used as the input to the generator. The mask image may identify portions of the original input image that may be modified by the generator.

In one embodiment, the first portion may include a missing data area, a drilling artifact area, a high contrast area, low resolution area, and a noise area. The area may be covered up and overwritten by the artificial subsurface data generated by the generator.

Figure 4:
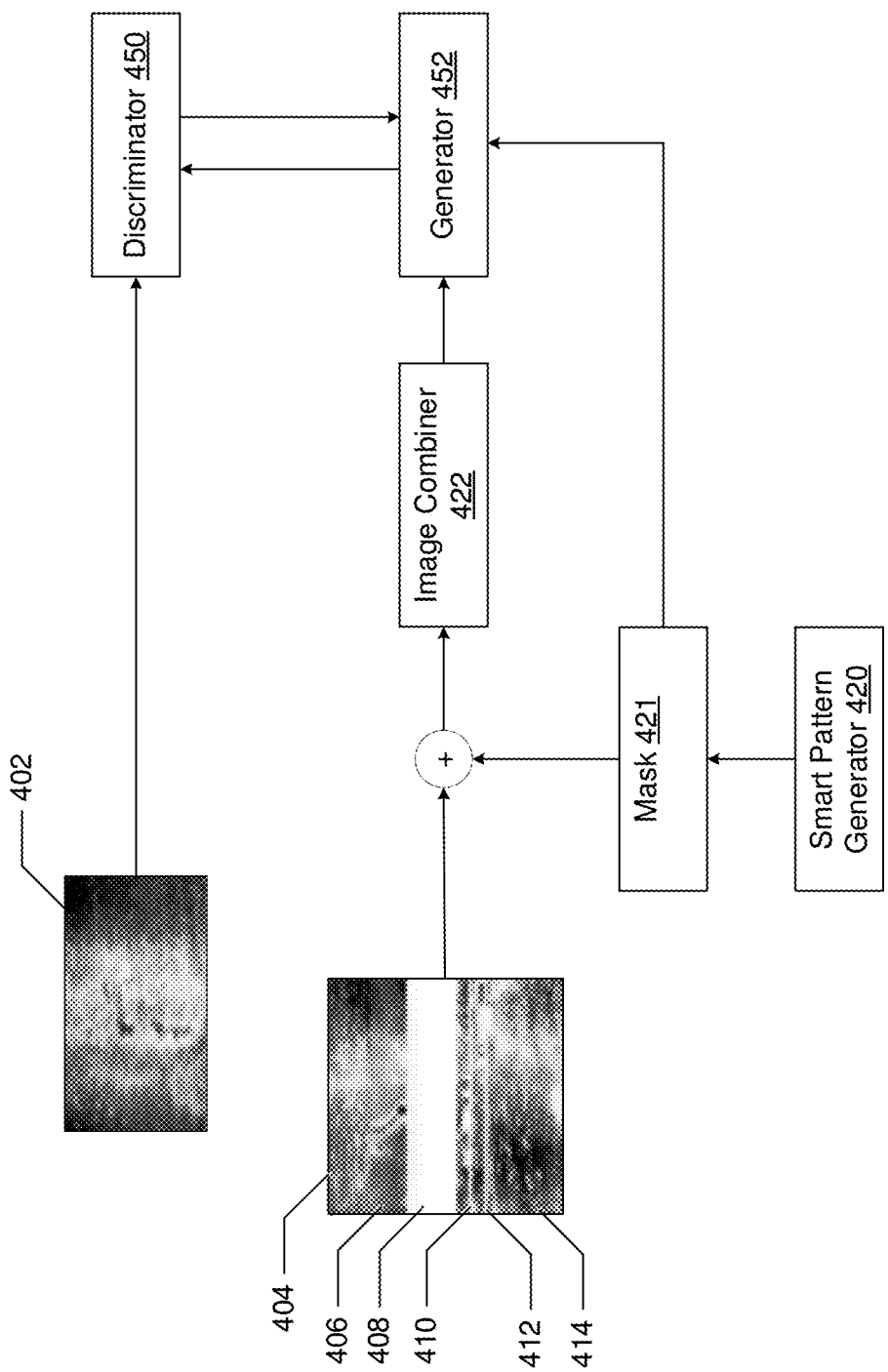
FIG. 4 shows examples in accordance with disclosed embodiments.

FIG. 4 shows examples of systems and models in accordance with the disclosure. FIG. 4 shows an example of using the machine learning model to generate an artificial subsurface data. The embodiments of FIG. 4 may be combined and may include or be included within the features and embodiments described in the other figures of the application. The features and elements of FIG. 4 are, individually and as a combination, improvements to the technology of computing systems, machine learning systems, E&P computer systems, and wellsite systems. The various features, elements, widgets, components, and interfaces shown in FIG. 4 may be omitted, repeated, combined, and/or altered as shown. Accordingly, the scope of the present disclosure should not be considered limited to the specific arrangements shown in FIG. 4.

Turning to FIG. 4, the training images (402) and (404) are used to train the discriminator (450) and the generator (452). After training, generator (452) may be used in a field application (e.g., at a wellsite) to generate artificial subsurface data.

The training image (402) include subsurface data without degradations. The training image (402) is associated with a label that identifies the training image (402) as an image that does not include artificial subsurface data. The training image (402) may be fed into the discriminator (450) to improve the accuracy of the discriminator (450).

The training image (404) includes subsurface data with the degradations (408), (410), and (412). The degradations (408), (410), and (412) are portions of the training image (404) with missing data. The training image (404) also includes portions (406) and (414) that do not have missing data. The training image (404) may be fed into the image combiner (422) with the mask (421) from the smart pattern generator (420).

The smart pattern generator (420) generates the mask (421) for the training image (404). The mask (421) may identify the degraded portions of the training image (404).

The image combiner (422) may combine the training image (404) with the mask (421) from the smart pattern generator (420). In one embodiment, the combined image from the image combiner (422) may include a first layer for the training image (404) and a second layer for the mask (421) from the smart pattern generator (420). In one embodiment, the image combiner (422) may use the mask (421) to identify portions of the training image (404) to zero out (set to zero) in the combined image that is sent to the generator (452).

The generator (452) receives a combined image from the image combiner (422). The generator (452) generates an output image that includes artificial subsurface data that covers up and overwrites the masked degradations (408), (410), and (412) from the training image (404). The output image from the generator (452) is then fed into the discriminator (450). The generator (452) may then receive back propagated feedback from the discriminator (450) to update the weights of the neural network in the generator (452) and improve the ability of the generator (452) to generate artificial subsurface data that cannot be detected by the discriminator (450). The mask (421) may be provided to the generator (452) to prevent updates to the weights and biases, e.g., during backpropagation, in the initial convolution layers of a convolutional neural network (CNN) of the generator (452). The weights and biases that correspond to the regions of an image that correspond to the mask (421) (which may include missing data or be degraded regions of the image) may be prevented by nullifying or zeroing out the updates to weights corresponding to regions of an image identified by the mask (421).

The discriminator (450) receives an input image, which may be either the training image (402) or output image from the generator (452). The output value of the discriminator (450) is compared to a label for the input image that identifies whether the input image includes artificial subsurface data. The comparison is performed with a loss function that generates an error value. The error value is fed back into the discriminator (450) using backpropagation to update the weights of the neural network of the discriminator (450). When the training image (402) is the input to the discriminator (450), backpropagation feedback is not provided to the generator (452). When the input to the discriminator (450) is the output image from the generator (452), backpropagation feedback is provided to the generator (452) and the weights of both the discriminator (450) and the generator (452) are updated.

Embodiments disclosed herein may be implemented on a computing system. Any combination of mobile, desktop, server, router, switch, embedded device, or other types of hardware may be used. For example, as shown in FIG. 5.1, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the technology.

The computing system (500) in FIG. 5.1 may be connected to or be a part of a network. For example, as shown in FIG. 5.2, the network (520) may include multiple nodes (e.g., node X (522), node Y (524)). Each node may correspond to a computing system, such as the computing system shown in FIG. 5.1, or a group of nodes combined may correspond to the computing system shown in FIG. 5.1. By way of an example, embodiments of the technology may be implemented on a node of a distributed system that is connected to other nodes. By way of another example, embodiments of the technology may be implemented on a distributed computing system having multiple nodes, where each portion of the technology may be located on a different node within the distributed computing system. Further, one or more elements of the aforementioned computing system (500) may be located at a remote location and connected to the other elements over a network.

Although not shown in FIG. 5.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5.1. Further, the client device (526) may include and/or perform all or a portion of one or more embodiments of the technology.

The computing system or group of computing systems described in FIGS. 5.1 and 5.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the technology. The processes may be part of the same or different application and may execute on the same or different computing system.

Rather than or in addition to sharing data between processes, the computing system performing one or more embodiments of the technology may include functionality to receive data from a user. For example, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the technology, may extract one or more data items from the obtained data. For example, the extraction may be performed as follows by the computing system in FIG. 5.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections).

Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5.1, while performing one or more embodiments of the technology, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the technology, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 5.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 5.1 and the nodes and/or client device in FIG. 5.2. Other functions may be performed using one or more embodiments of the technology.

While the technology has been described with respect to a limited number of embodiments, those skilled in the art, having benefit of this disclosure, will appreciate that other embodiments may be devised which do not depart from the scope as disclosed herein. Accordingly, the scope of the technology should be limited only by the attached claims.

What is claimed is:

1. A method comprising:
   training a discriminator of a training model to discriminate between original training images without artificial subsurface data and modified training images with artificial subsurface data;
   training a generator of the training model to:
      replace portions of original training images with the artificial subsurface data to form the modified training images, and
      prevent the discriminator from discriminating between the original training images and the modified training images;
   training the discriminator while training the generator using backpropagation; and
   preventing updates, during the backpropagation, to weights, of the generator, that correspond to regions of an image that correspond to a mask.

2. The method of claim 1, wherein training the generator further comprises:
   training the generator with the discriminator,
      wherein the generator comprises a first convolutional neural network, and
      wherein the discriminator comprises a second convolutional neural network feeding into a fully connected neural network.

3. The method of claim 1, further comprising:
   deploying a deployment model comprising the generator from the training model without the discriminator.

4. The method of claim 3, further comprising:
   receiving an input image with subsurface data;
   inputting the input image into the generator of the deployment model; and
   outputting, by the deployment model, an output image comprising artificial subsurface image data that overwrites a first portion of the input image without overwriting a second portion of the input image.

5. The method of claim 4, further comprising:
   masking the first portion of the input image from the second portion of the input image using a smart pattern generator.

6. The method of claim 4,
   wherein the input image is generated with a blend filter that identifies a minimum resistivity and a maximum caliper radius.

7. The method of claim 4,
   wherein the input image includes metadata comprising well depth, caliper radius, and inclination.

8. The method of claim 4,
   wherein the first portion comprises one of a missing data area, a drilling artifact area, a high contrast area, low resolution area, and a noise area.

* * * * *